Aug. 18, 1953    E. H. KOENIG ET AL    2,649,528
WELDING ENDS OF COPPER COILS
Filed Sept. 27, 1950    3 Sheets-Sheet 3
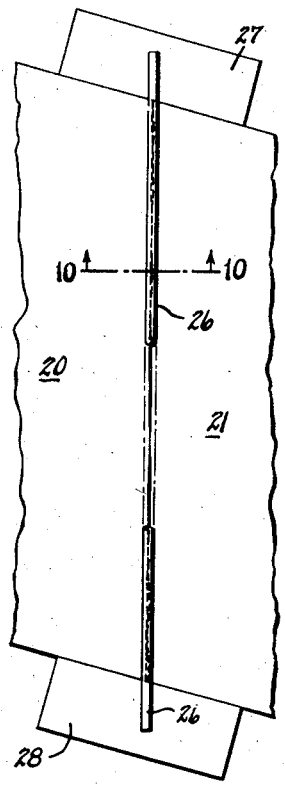
Fig. 7
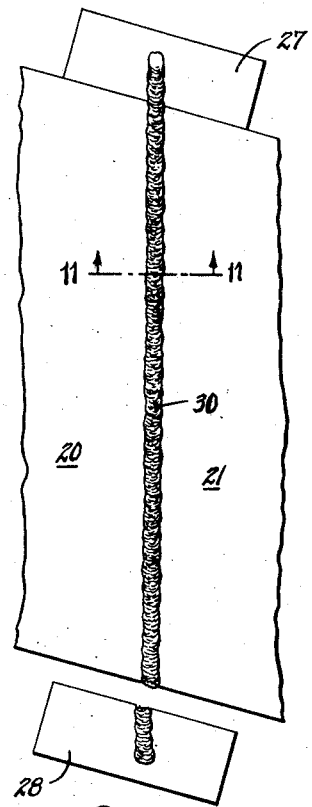
Fig. 8
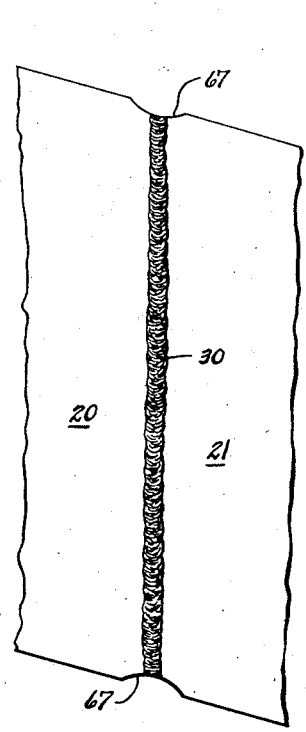
Fig. 9
Fig. 11
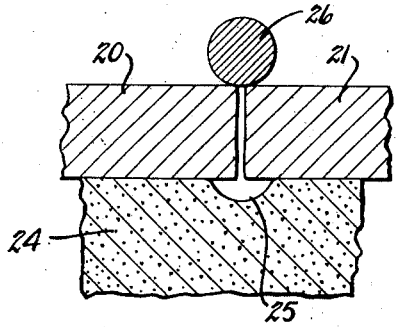
Fig. 10
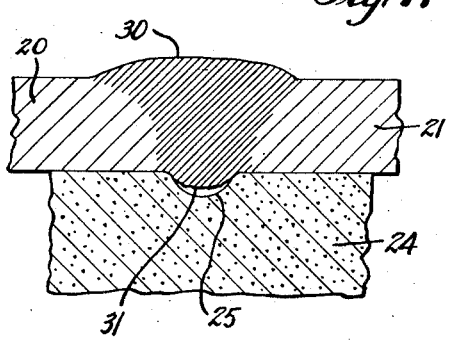
INVENTORS
EDWARD H. KOENIG
BY  JOHN CHESNAVICH
Harold F. Wilhelm
ATTORNEY.

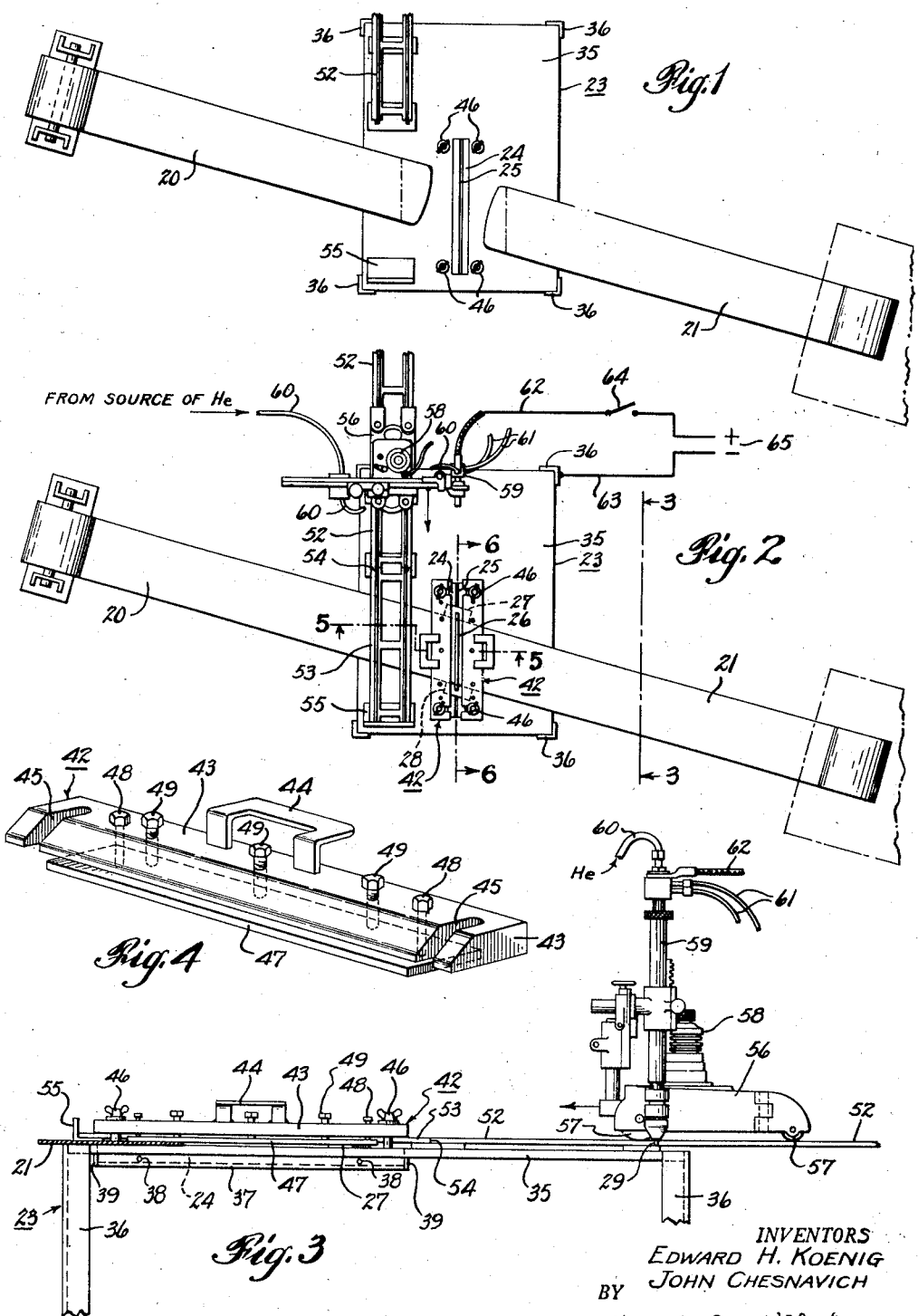

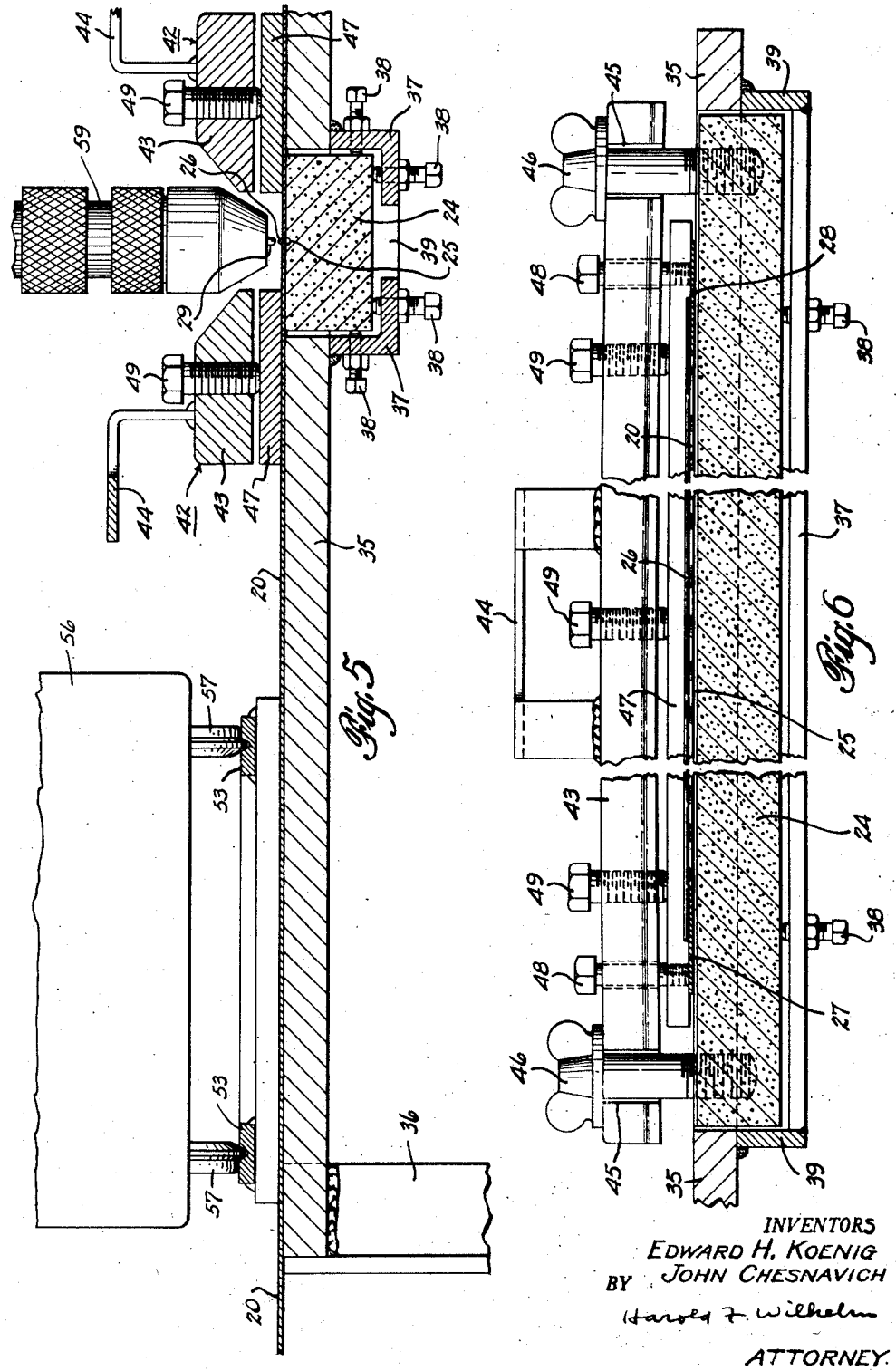

Patented Aug. 18, 1953

2,649,528

UNITED STATES PATENT OFFICE 2,649,528

WELDING ENDS OF COPPER COILS

Edward H. Koenig, New Haven, and John Chesnavich, Seymour, Conn., assignors to The New Haven Copper Company, Seymour, Conn., a corporation of Connecticut Application September 27, 1950, Serial No. 186,967

2 Claims. (Cl. 219—10)

This invention relates to production welding of one electrolytic copper coil to another so as to increase the effective length of a single coil as utilized by the copper fabricator.

In recent years there has been a demand, on the part of copper and brass fabricators who feed coils of metal into automatic machines, for long coils approximating the length of those received from steel mills. The length of coils rolled from standard size copper cakes, as cast by the electrolytic copper refineries, have been much too short to satisfy these conditions. To solve this problem, attempts have been made to braze or weld the coils, either before or after the finished rolling process.

The problem of welding electrolytic copper coils has been a difficult one to solve because of the inherent characteristics of the material, particularly its relatively high inherent oxygen content, its affinity for picking up oxygen during the welding and cooling stages, the high rate of conductivity of the metal and its high coefficient of expansion and contraction. The problem is accentuated by the fact that the weld must form a homogeneous part of the finished lengthened coil so that the automatic machines of the fabricator can utilize that part of the coil containing the weld in exactly the same way as it utilizes the other parts of the coil.

With brass or bronze the difficulties of solving this problem were not too great because of the presence of elements other than copper which acted as deoxidizers. Hard solder makes a good mechanical connection for electrolytic copper coils but does not satisfy the necessity for homogeneity required by the fabricators; if a piece of fabricated work includes a soldered seam, it usually has to be thrown away.

According to the present invention, the problem of production welding of electrolytic copper coils has been solved in a relatively simple and expeditious manner by the use of the apparatus and by the method as hereinafter set forth.

The invention also consists in certain new and original features and combinations hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part hereof, in which:

Fig. 1 is a plan view, partly diagrammatic, of the welding table, illustrating the position of the coils before end-cutting and welding, with parts of the welding apparatus removed and exposing the carbon bar;

Fig. 2 is a plan view of the welding apparatus, showing the coils in position, ready for a welding operation;

Fig. 3 is a vertical section taken on the line 3—3 of Fig. 2;

Fig. 4 is a perspective of one of the clamping assemblies for clamping the coil ends and end pieces down to the table during welding;

Fig. 5 is a vertical section, taken on the line 5—5 of Fig. 2, illustrating the construction of the clamping assemblies and of the carbon welding bar;

Fig. 6 is a vertical section taken on the line 6—6 of Fig. 2, illustrating how the clamping assemblies clamp the coil ends to the table and showing the filler wire and the end pieces in place;

Fig. 7 is a diagram illustrating the position of the coil ends, with the end pieces in place, and with the filler wire in place, just before the starting of the welding operation;

Fig. 8 illustrates the finished weld, showing one of the end pieces broken off and the other end piece still attached to the coils;

Fig. 9 illustrates the finished weld after the ends of the weld are cut out;

Fig. 10 is a section on the line 10—10 of Fig. 7 showing the filler wire resting over the joint between coil ends, the relation of the coil ends, the groove in the carbon bar and the upper welding electron, prior to welding; and Fig. 11 is a section on the line 11—11 of Fig. 8 and illustrating diagrammatically the appearance of the finished weld.

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosures of the invention is made for purposes of explanation, but it will be understood that the details may be modified in various respects without departure from the broad aspect of the invention.

The process and apparatus will be first generally described after which they will be described more in detail.

It will be understood that electrolytic copper coils are commonly rolled from 300 pound cakes into the usual form. For example, these rolls may be about 22 inches in width and about 0.90 inch in thickness at the time of the welding operation.

To weld the coils, the coil ends are first prepared by cutting their ends on a bias to form edges of about 15° to a line normal to the length of the strips. The seam is then welded, after which the joined strips are subjected to the usual rolling operations to roll down to finished size, anywhere from .012 to .050 inch in thickness, for example. This is done by passing the strips between the usual rolls of a rolling mill. The fact that the welded seam is located on a bias causes the seam to enter between the rolls gradually without jarring or edge cracking.

Referring principally to Fig. 2, the apparatus for performing the welding operation comprises, in general, a work table 23 supporting a carbon bar 24 having a groove 25. The biased edges of the coils 20 and 21 are laid over the groove. Small end pieces of copper 27 and 28 are laid alongside of the strips at the ends of the crevice. See Fig. 7. A copper filler wire 26 is laid over the crevice between the strips.

The welding machine (see also Fig. 3) includes a tungsten electrode rod 29 carried by a carriage 56 running on tracks 52, 53. The welding current is direct current; the positive terminal is connected to the electrode 29 and the negative terminal is connected to the table 23 which is in electrical conducting relation to the workpieces. Helium gas is fed at the welding point and then let go to waste.

Welding is started by striking an arc at one of the small copper end pieces 27. The carriage 56 is then moved slowly along its tracks 52, 53 to carry the arc along the filler wire 26. This melts the filler wire 26 and forms the weld. The welding operation is stopped at the other end piece 28.

When the welding is completed, the copper end pieces 27 and 28 are broken off from the work (see Fig. 8) and if desired, scallops 67 (Fig. 9) are cut out of the side edges of the joined strips at the ends of the weld seam. The joined coils are then subjected to the further rolling operations to reduce size, as explained above.

The welding apparatus will now be described more in detail.

The table 23 is made of suitable structural steel and comprises a top plate 35 with legs 36 suitably welded thereto. The top plate 35 has an elongate recess in which is disposed the carbon bar 24. Angles 37 and end plates 39 are suitably welded to the under surface of the top plate 35 to provide a seat for the carbon bar 24. Suitable set screws, indicated by 38, are provided for adjusting the position of the carbon bar so that its upper surface is flush with the top of the table.

Referring more particularly to Figs. 4, 5 and 6, the work clamps or clamping assemblies 42 will now be described. These clamps hold the coils in proper position down against the table top during the welding operation. The work clamps are identical so it is only necessary to describe one.

Each work clamp 42 comprises a main bar 43 having a handle 44 by which the work clamp may be removed from the table whenever desired. The main bar 43 has end slots 45 to receive thumb screws 46 which are threaded into the table top 35.

Under the main bar 43 is an auxiliary bar 47 held in loose assembled relationship to the main bar 43 by hanger bolts 48 which pass loosely through the main bar 43 and are threaded into the auxiliary bar 47. Adjusting bolts or set screws 49 are screw threaded through the main bar 43 and engage the top surface of the auxiliary bar 47.

To use the clamps, when it is desired to unclamp the end of a coil from the table, it is only necessary to loosen the set screws 49; this releases tension on the thumb bolts 46; the thumb bolts may be loosened if desired, after which the assembled main bar 43 and auxiliary bar 47 may be removed by sliding the bars laterally to disengage the thumb bolts from the slots 45 and then engaging the handle 44 by a suitable hoist or the like. The welded coil is then removed for further processing.

The new coils are then placed in position with their biased edges disposed directly over the groove 25 in the carbon bar. The clamp assemblies are then placed back into position on the table with the slots 45 engaging around the thumb bolts 46. The thumb bolts are then suitably tightened by hand after which the adjusting set screws 49 are then tightened by wrenches, just enough to firmly hold the auxiliary bar 47 down against the work to hold the work in position on the table.

The movable welding machine will now be described. See particularly Figs. 2 and 3. This machine is more or less standard apparatus suitably modified according to the invention to perform the necessary functions. It comprises a carriage 56 which rolls on a track disposed parallel to the groove 25 in the carbon bar 24. The track comprises a fixed section 52 and a removable section 53, the latter being removable for the purpose of positioning the copper coil which passes thereunder. The track sections have a tongue and groove connection 54 at one end of the movable section 53. The other end of the movable section 53 is disposed in a recess formed by angularly related pieces 55 suitably welded to the top of the table.

The carriage 56 has wheels 57 rolling along the tracks 52 and 53. The carriage supports a suitable vertical drive motor 58 which drives the wheels to carry the carriage across the work to weld the seam. The carriage also supports an electrode holder 59 which carries the tungsten electrode 29. The electrode holder 59 has suitable adjustment (which forms no part of the present invention) for properly positioning the tungsten electrode 29 with respect to the seam to be welded. The electrode holder 59 carries a helium supply conduit 60 for supplying helium at the welding point. The helium passes down through the holder 59 and is discharged from the lower end to surround the welding arc and blanket the weld. The helium is then let go to waste. The electrode holder 59 has suitable cooling conduits 61 for conducting cooling water to the electrode as is well known.

The electric welding circuit is as follows. See Fig. 2. It comprises a positive wire 62 which is connected to the electrode holder 59 and to the positive terminal of a suitable source of welding direct current indicated by 65. A suitable switch 64 may be interposed for controlling the welding current. The negative pole of the source of welding current 65 is connected by wire 63 to the work table 23. The copper coils being clamped to the work terminal, thus form the negative electrode of the welding arc. The tungsten electrode 29 becomes the positive electrode.

To carry out the method according to the invention, the ends of the copper coils 20, 21 to be welded are first cut on a bias, as for example, at an angle of 15° with respect to the length of the coils. The biased edges are then placed in substantially abutting relation directly over, and following, the groove 25 in the carbon bar 24. See Figs. 2, 7 and 10. The end pieces 27 and 28 are placed in position at the ends of the joint.

The ends of the copper coils and the end pieces 27, 28 are then clamped down against the work table by the work clamps 42 in a manner described above. It is preferable to clamp the coil ends down to the table only sufficiently tightly to hold the coils in proper position but not tightly enough to prevent expansion and contraction of the copper coils.

The copper filler wire 26 is then laid over the crevice as shown especially in Figs. 7 and 10.

It is preferred that the composition of both filler rod 26 and end strips 27, 28 should be the same as the coils being welded together. The filler rod, particularly, should be of the same composition so that there will be no section in the welded coil which is of different composition. Both rod and end strips may be electrolytic, deoxidized (phosphorized) or oxygen free.

We are now ready to start the welding operation. The removable section of track 53 is then placed in position and the welding machine is gotten in readiness. It is rolled along the track to place the tungsten electrode 29 over the starting end piece 27, the helium is turned on, and the arc is struck. The machine is then started along its track and the tungsten electrode 29 moved slowly over and along the filler wire 26 and the welding continues until the tungsten electrode reaches the other end piece 28 when the welding is stopped. The machine is then moved back to starting position. The movable track section 53 is removed. The work clamps 42 are removed and the joined strip is taken from the machine.

The end pieces 27 and 28 may then be broken off since they are connected to the joined copper strips only by the weld. If desired, scallops 67 are then cut into the side edges of the joined strip at the ends of the seam, as indicated in Fig. 9, to remove all possibility of edge cracking.

The joined coil is then subjected to further rolling operation to reduce to size by passing between the usual rolls (not shown). The location of the weld on a bias eases the weld into the rolls without jarring, or edge cracking.

It will be noted that the weld forms a flat bead 30 at the top of the seam and a small bead 31 at the bottom of the seam in the groove 25. The composition and texture of the weld is such that, when the coils are rolled to reduce to size, the weld is also squeezed and a homogeneous connection is formed. This connection is of such nature that it is impossible to distinguish in the finished product between the place where the welded seam is located and the other unwelded parts of the coils.

The dimensions and sizes of the various parts may vary considerably, depending upon the working conditions. In the example shown, with the copper coils being 0.90 inch in thickness at the time of welding, the carbon bar may be about 3/8 of an inch thick and its groove 25 about 1/16 of an inch deep. The copper filler wire 26 may be 1/8 of an inch in diameter. The top bead 30 formed by the weld may be about 1/32 of an inch in height and the bottom bead 31 may be about the same height.

The advantages of this invention are obvious to those skilled in the art. By it, it is possible to weld two coils of electrolytic copper to form a weld which is of such homogeneity, with respect to the surrounding material, that after the joined coil is further rolled to size, it is impossible to distinguish between the welded and unwelded portions. The lengthened copper coil may be fed to the usual fabricating machines and the material may be cut from the lengthened coil without regard to the position of the seam.

The invention is of such nature that, when once proper conditions for specified gauges are determined, unlimited quantities can be welded entirely automatically without danger of failure. The weld lends itself to a high degree of cold reduction to light gauges in a rolling mill. There is no necessity to scarf the beads. There is no edge cracking or failure in the seam.

The use of the inert atmosphere, such as helium, and the use of a carbon bar helps provide non-oxidizing conditions so that the local casting, which comprises the weld, is of the same composition as the other parts of the coils. The tungsten electrode is inert and substantially non-consumable, and lasts for a very long time. The carbon bar is easily shaped and grooved, is a good conductor of electricity, and does not oxidize at the temperature involved. Helium gas is inert and seems to work better with a D. C. arc than argon or nitrogen.

While certain novel features of the invention have been disclosed herein, and are pointed out in the annexed claims, it will be understood that various omissions, substitutions and changes may be made by those skilled in the art without departing from the spirit of the invention.

What is claimed is:

1. The method of welding the ends of electrolytic copper sheets which comprises disposing the edges in juxtaposition over a groove in a carbon bar, placing end pieces at the ends of the crevice formed by the juxtaposed edges, holding the sheets in proper relationship, placing a copper filler wire on top of the juxtaposed edges over said crevice, disposing a tungsten electrode over the filler wire, applying a direct current welding voltage across the gap between the tungsten electrode and the filler wire, with the positive pole applied to the tungsten electrode, starting the weld at one end piece, propelling the tungsten electrode along the filler wire to form a continuous weld along the length of the crevice, and terminating the weld at the other end piece, while enveloping the arc in helium.

2. The method of connecting the ends of two electrolytic copper coils to form a coil of increased length, said method comprising cutting the ends of the coils on a bias, disposing the cut edges in juxtaposition over a shallow groove in a carbon bar, placing end pieces at the ends of the crevice formed by the juxtaposed edges, clamping the coil ends and end pieces to the table with sufficient pressure to hold the parts in proper relationship, without preventing expansion and contraction of the edges of the coils, resting a copper filler rod on top of said crevice, disposing a tungsten electrode over the filler rod, starting the weld at one end piece, propelling the tungsten electrode along the filler rod to form a continuous weld along the length of the crevice, and terminating the weld at the other end piece, detaching the end pieces from the welded coils, cutting out the ends of the welded seam, and further rolling the connected coils to reduce their gauge.

EDWARD H. KOENIG.
     JOHN CHESNAVICH.

References Cited in the file of this patent

UNITED STATES PATENTS

| Number | Name | Date |
|---|---|---|
| 1,512,787 | Morton | Oct. 21, 1924 |
| 1,604,180 | Lincoln | Oct. 26, 1926 |
| 1,986,303 | Swift | Jan. 1, 1935 |
| 2,093,881 | Conrad | Sept. 21, 1937 |
| 2,170,019 | Gaylord | Aug. 22, 1939 |
| 2,206,375 | Swift | July 2, 1940 |
| 2,274,631 | Meredith | Feb. 24, 1942 |
| 2,280,551 | Somerville | Apr. 21, 1942 |
| 2,405,542 | Wassell | Aug. 6, 1946 |